(12) United States Patent
Davis et al.

(10) Patent No.: US 6,629,244 B2
(45) Date of Patent: *Sep. 30, 2003

(54) PLATFORM AND METHOD FOR ASSURING INTEGRITY OF TRUSTED AGENT COMMUNICATIONS

(75) Inventors: Derek L. Davis, Phoenix, AZ (US); Howard C. Herbert, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/995,994

(22) Filed: Nov. 16, 2001

(65) Prior Publication Data

US 2002/0040436 A1 Apr. 4, 2002

Related U.S. Application Data

(63) Continuation of application No. 09/298,360, filed on Apr. 23, 1999, now Pat. No. 6,389,537.

(51) Int. Cl.[7] ............................ G06F 11/30; H04L 9/32
(52) U.S. Cl. .................................. 713/187; 713/201
(58) Field of Search .............................. 713/187, 189, 713/190, 191, 193, 161, 201, 164, 200

(56) References Cited

U.S. PATENT DOCUMENTS

| | | |
|---|---|---|
| 5,235,642 A | 8/1993 | Wobber et al. |
| 5,473,692 A | 12/1995 | Davis |
| 5,539,828 A | 7/1996 | Davis |
| 5,568,552 A | 10/1996 | Davis |
| 5,592,553 A | 1/1997 | Guski et al. |
| 5,757,919 A | 5/1998 | Herbert et al. |
| 5,796,840 A | 8/1998 | Davis |
| 5,805,712 A | 9/1998 | Davis |
| 5,818,939 A | 10/1998 | Davis |
| 5,844,986 A | 12/1998 | Davis |
| 5,892,904 A | 4/1999 | Atkinson et al. |
| 5,937,063 A | 8/1999 | Davis |
| 5,949,881 A | 9/1999 | Davis |
| 5,966,446 A | 10/1999 | Davis |
| 5,970,147 A | 10/1999 | Davis |
| 6,021,201 A | 2/2000 | Bakhle et al. |
| 6,023,509 A | 2/2000 | Herbert et al. |
| 6,058,478 A | 5/2000 | Davis |
| 6,199,053 B1 | 3/2001 | Herbert et al. |
| 6,389,537 B1 * | 5/2002 | Davis et al. ............... 713/187 |
| 6,389,538 B1 * | 5/2002 | Gruse et al. .............. 713/194 |

FOREIGN PATENT DOCUMENTS

| | | |
|---|---|---|
| EP | EP0686906 A2 | 5/1995 |
| EP | EP0778512 A2 | 11/1996 |
| WO | WO98/45768 | 10/1998 |

* cited by examiner

Primary Examiner—Matthew Smithers
(74) Attorney, Agent, or Firm—Blakely, Sokoloff, Taylor & Zafman LLP

(57) ABSTRACT

A cryptographic device comprising a processing logic and memory associated with the processing logic. The memory is loaded with a first segment of code to control execution of cryptographic functions and hash functions, and a second segment of code to perform cryptographic functions on behalf of a third party having no physical control of hardware employing the cryptographic device.

19 Claims, 7 Drawing Sheets

PLATFORM AND METHOD FOR ASSURING INTEGRITY OF TRUSTED AGENT COMMUNICATIONS

This is a continuation of U.S. patent application Ser. No. 09/298,360 filed Apr. 23, 1999, which has now matured to U.S. Pat. No. 6,389,537.

BACKGROUND OF THE INVENTION

1. Field of the Invention

The present invention relates to the field of cryptography. In particular, this invention relates to a system and method to protect digital content resident in a digital platform.

2. General Background

For many years, there has been a growing demand for platforms that provide video programming for entertainment purposes. Normally, the video programming (e.g., pay-per-view movies) is transmitted in an analog format such as National Television Systems Committee (NTSC) or Phase Alternating Line (PAL). Due to the inherent nature of analog signaling, video programming is protected because recorded copies normally would have poorer image quality than the original master. Also, copy protection signals may be added to the signaling in order to prevent its successful recordation. The inherent nature of content in a digital format, however, fails to provide these safeguards against modification and recordation.

Currently, original equipment manufacturers (OEMs) are developing open, re-programmable digital platforms to receive content in a digital format. For example, in the case of pay-per-view movies, a customer issues a request to a content provider (e.g., a cable company) to download a movie to the digital platform. Upon receiving authorization, the movie is downloaded and, in accordance with one purchasing scheme, an appropriate charge is debited from a prepaid balance maintained by the digital platform. This purchasing scheme is referred to as "metered content." When the prepaid balance has been exhausted, the customer initiates contact with the content provider or an independent third-party source to establish additional credit.

Unfortunately, since many digital platforms are open and programmable, their functional elements (e.g., hardware, software, or firmware) can be observed and modified by an unauthorized user or by a malicious program. As a result, it is difficult for content providers to ensure that a digital platform is operating as intended. Encrypting the communication channels or using conventional digital signatures may prevent content from being unknowingly modified during transmission; however, these techniques do not provide assurances to the content provider that the content, once loaded within the digital platform, has not been illicitly modified. For example, there is no protection against disabling content metering software responsible for debiting the prepaid balance or modifying content metering software responsible for crediting the prepaid balance.

Moreover, even if the software has not been corrupted, there are no assurances to the content provider that communication or processing circuitry within the digital platform has not been compromised. For example, substitute circuitry or software (e.g., motherboard circuitry, basic input/output system "BIOS", operating systems, etc.) may be deployed within the digital platform which does not comply with the desired content metering scheme. Additionally, hardware-based methods, such as use of a logic analyzer, may compromise the scheme. These security threats have greatly impeded the expansion of digital content distribution.

Therefore, it is desirable to provide a digital platform and protocol to ensure that the digital platform and its implemented functional elements are authorized and are operating as intended.

SUMMARY OF THE INVENTION

A cryptographic device comprising a processing logic and memory associated with the processing logic. The memory is loaded with a first segment of code to control execution of cryptographic functions and hash functions, and a second segment of code to perform operations on behalf of a third party having no physical control of hardware employing the cryptographic device.

BRIEF DESCRIPTION OF THE DRAWINGS

The features and advantages of the present invention will become apparent from the following detailed description of the present invention in which.

DETAILED DESCRIPTION

Figure 1:
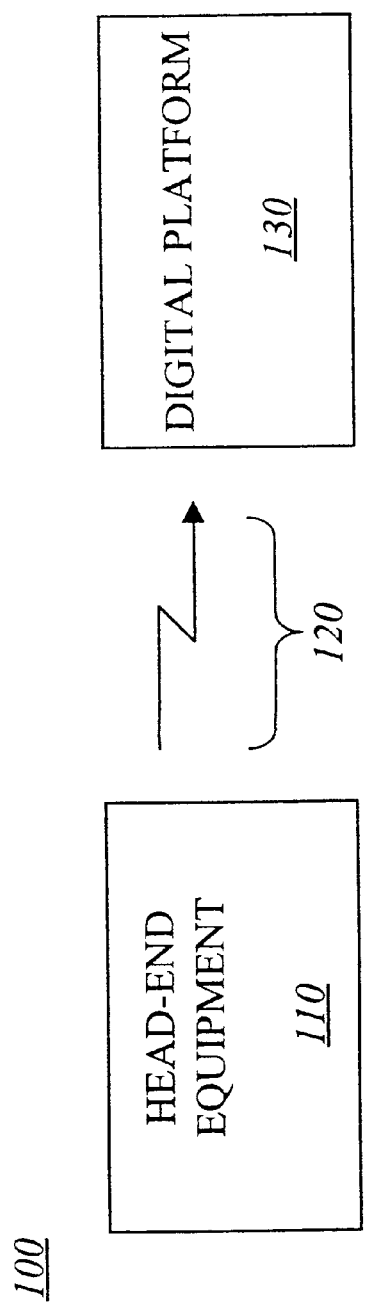
FIG. 1 is an illustrative block diagram of an embodiment of a system to transfer content from a head-end to a digital format.

The present invention relates to a system and a corresponding method for ensuring that a programmable digital platform is operating as intended. This is accomplished by providing a protocol that enhances protection of the integrity of data transferred to the digital platform. While certain details are set forth in order to provide a thorough understanding of the present invention, it should be appreciated that these details should not limit the scope or applicability of the present invention. Likewise, well-known circuitry is not discussed in great detail to avoid unnecessarily obscuring the present invention.

In the following description, some terminology is used to describe certain characteristics of the present invention as well as cryptographic functionality. For example, "content" is generally defined as (i) control information (e.g., Internet Protocol "IP" commands, keys, digital signatures, digital certificates, etc.), and/or (ii) data in the form of a still image, video (e.g., a movie, television programming, pay-per-view programming, a video game, etc.), audio, software and the like. A "channel" is generally defined as a pathway through which content may be transferred over one or more information-carrying mediums such as, for example, electrical wire, fiber optic, cable, bus trace, plain old telephone system (POTS) line, wireless (e.g., satellite, radio frequency "RF", infrared, etc.) or even a logical link.

With respect to cryptographic functionality, a "key" is information used by a cryptographic function to perform a particular operation related to encryption or decryption. A "cryptographic function" is a software routine or a collective acts related to encryption, decryption and/or digital signaturing. Examples of cryptographic functions include a symmetric key cryptographic function (e.g., Data Encryption Standard "DES"), an asymmetric (public key) cryptographic function (e.g., Rivest, Shamir and Adleman "RSA" based functions), or even a function for digitally signing information (e.g., Digital Signature Algorithm "DSA" or a RSA-based signing functions).

In addition, a "digital certificate" is generally defined as any information used for authentication. Normally, this information includes a public key encrypted with a private key of a certification authority (PRKCA). A "certification authority" includes any person or entity in a position of trust to guarantee or sponsor the digital certificate. A "digital signature" is generally used to ensure that the data has not been illicitly modified after being digitally signed. The data may be provided in its entirety, or as a hash value produced by a hash function. A "hash function" involves an operation where content of a variable-length is converted into a fixed-length hash value. Normally, hash functions are "one-way" so that there does not readily exist an inverse function to recover a portion of the original content from the hash value. Examples of a hash function include MD2 or MD5 provided by RSA Data Security of Redwood City, Calif., or Secure Hash Algorithm (SHA-1) as specified by the National Institute of Standards and Technology located in Washington, D.C.

Referring to FIG. 1, a perspective view of an illustrative embodiment of a system utilizing the present invention is shown. In this embodiment, system 100 includes head-end content distribution equipment 110 that is controlled by a content provider. Normally, head-end equipment 110 is remotely located from and in communication with a digital platform 130 through a channel 120. An example of head-end equipment 110 includes, but is not limited or restricted to a satellite, a cable station, or any hardware capable of downloading content. The content may be in real-time or prestored on a hard disk drive, a compact disk, a digital video disk, a digital tape or any other type of medium. Of course, it is contemplated that the present invention may also ensure that the integrity of communications between digital platform 130 and a peripheral or other content storage device is maintained.

Figure 2:
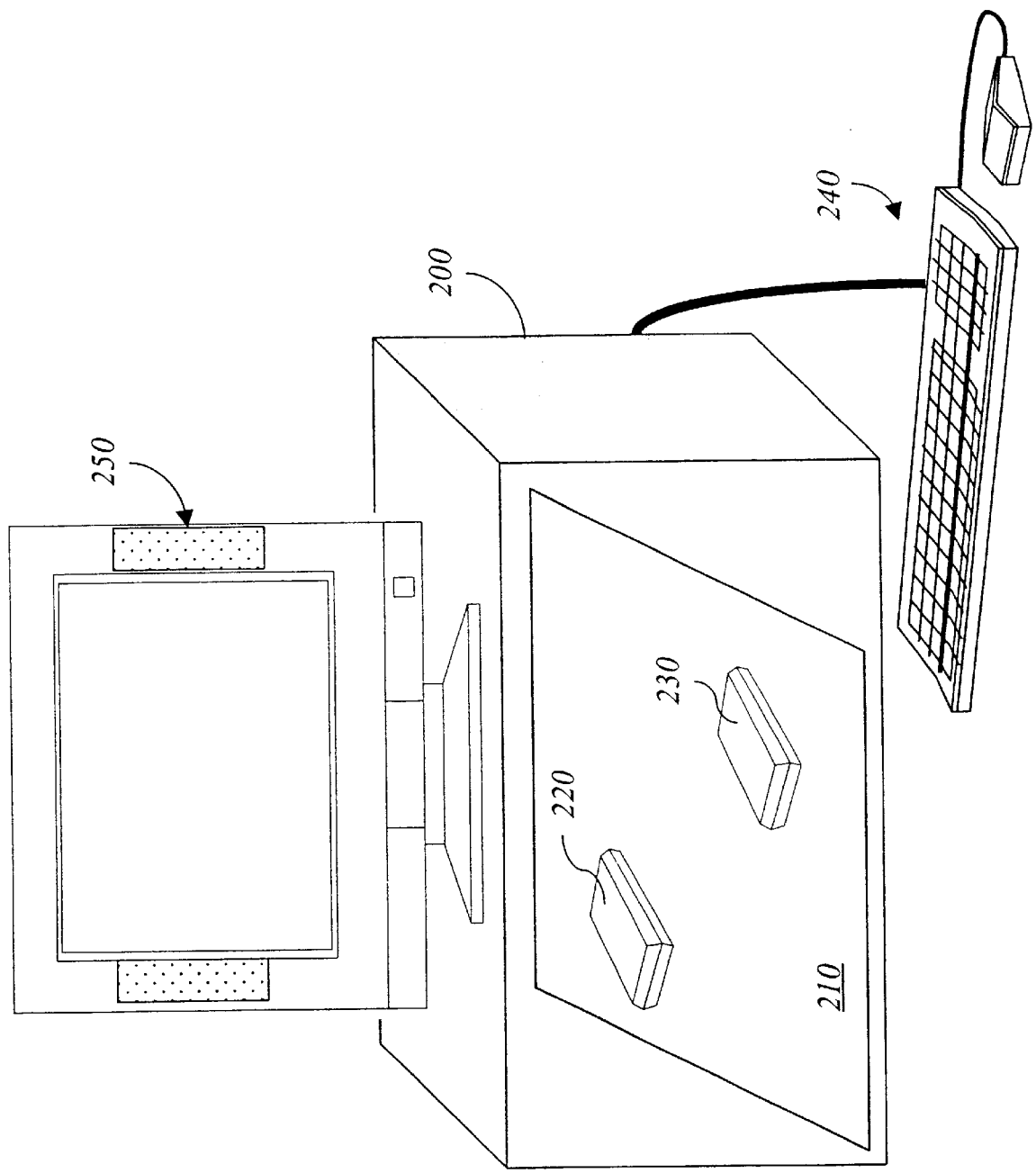
FIG. 2 is an illustrative block diagram of an embodiment of the digital platform of FIG. 1.

Referring now to FIG. 2, an illustrative block diagram of digital platform 130 is shown. Digital platform 130 comprises a casing 200 protecting a substrate 210 contained therein. Substrate 210 is formed from any type of material or combination of materials upon which integrated circuit (IC) devices can be attached such as memory 220 and a cryptographic device 230. Substrate 210 may be produced in a number of form factors such as, for example, a circuit board acting as a motherboard or a removable daughter card, a network interface card (NIC), and the like. Digital platform 130 receives input from one or more input peripherals 240 (e.g., a mouse, keyboard, infrared controller, etc.) and produces an output, perceived by the user, on an output device 250 (e.g., a display monitor, speakers, etc.).

In this embodiment, memory 220 includes software that, when executed, operates as a graphical user interface (GUI). It is contemplated that memory 220 may further include content usually in an encrypted digital format if communications between memory 220 and cryptographic device 230 are secure and/or memory 220 itself is secure. For example, memory 220 can constitute secure storage when it is generally infeasible for an unauthorized individual to successfully access content from memory 220 in an non-encrypted format and/or tamper with the data without detection. Different security mechanisms include packages designed to destroy information on ICs when tampered, and tamper resistant software as described in U.S. patent application entitled "Tamper Resistant Methods and Apparatus", application Ser. No. 08/662/679, filed Jun. 13, 1996 which has issued as U.S. Pat. No. 5,892,899. Of course, there exist many other embodiments of security mechanisms that differ in design but do not deviate from the spirit and scope of the invention.

Herein, cryptographic device 230 is implemented as a coprocessor operating in coordination with a host processor. However, it is contemplated that cryptographic device may be implemented within a chipset, or implemented as the host microprocessor, a controller, or any other electronic device having data processing capability.

Figure 3:
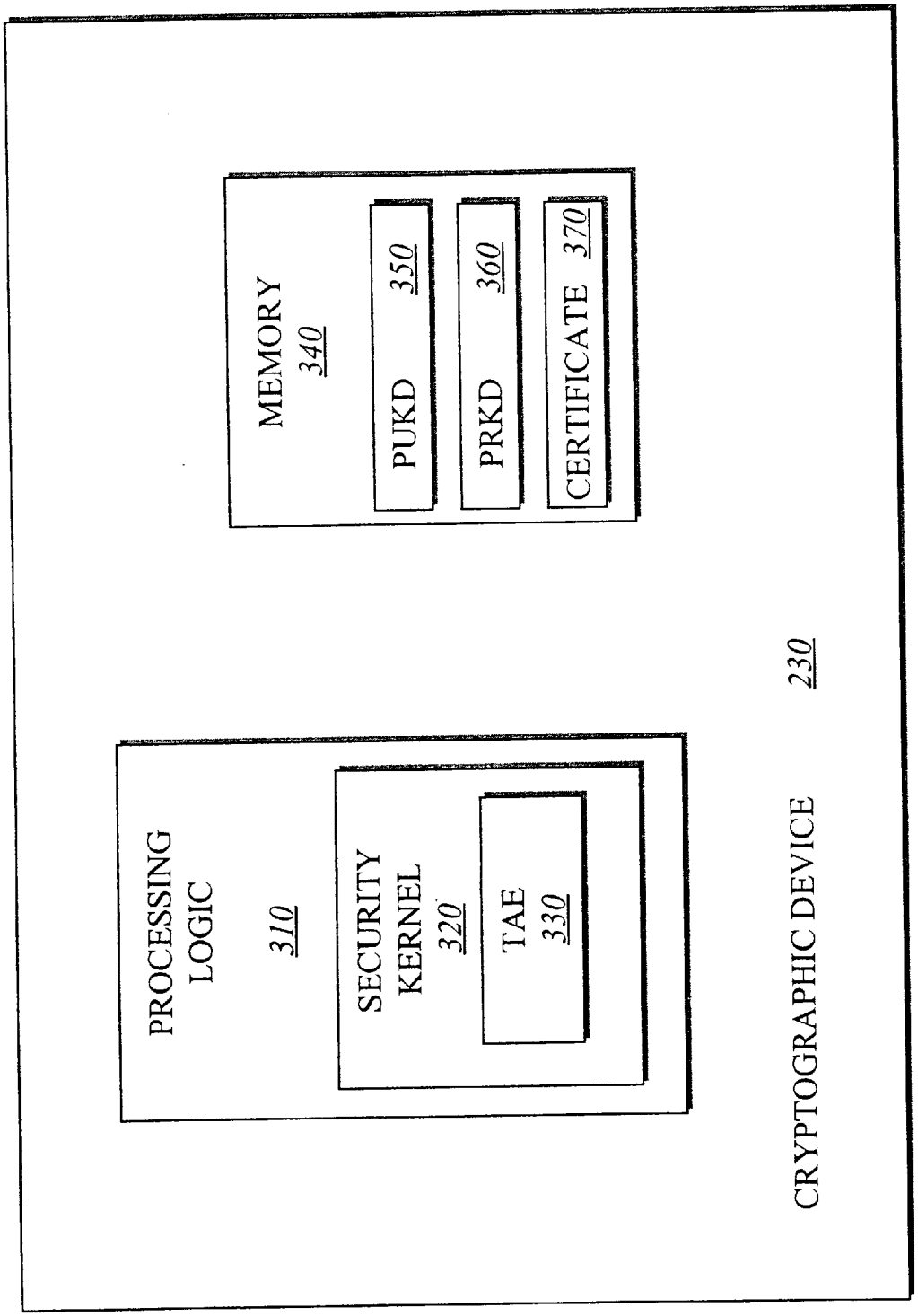
FIG. 3 is an illustrative block diagram of a cryptographic device associated with the digital platform.

Referring now to FIG. 3, in this embodiment, cryptographic device 230 comprises processing logic 310 having a limited amount of memory loaded with a first segment of code 320 and a second segment of code 330. The first segment 320, referred to as a "security kernel," includes code that, when executed, controls the operations of code 330 and controls the execution of cryptographic functions, hash functions and other generate management functions used to protect the integrity of data provided to the content provider. In this embodiment, security kernel 320 is running at Ring 0 of device 230 although it is not required. The security kernel 320 is generally a permanent element of device 230, loaded therein at manufacture and subject to unauthorized removal or modification. The second segment of code 330 is referred to as a "trusted agent executable (TAE)." When executed, TAE 330 performs operations on behalf of a third party having no physical control of the digital platform. This code supports content metering as well as other functionality. Also, TAE 330 operates in combination with security kernel 320 to produce a data packet for transmission to head-end equipment 110 of FIG. 1. This data packet provides information to the content provider to determine that the originator of the data packet was indeed TAE 330 and that the integrity of communications between the content provider and TAE 330 is protected. TAE 330 is loaded on an "as needed" basis in the field. Different TAEs, provided by multiple, independent third parties may exist and be loaded at various times into device 230.

As further shown, cryptographic device 230 also comprises internal memory 340 loaded with a device public key (PUKD) 350, a device private key (PRKD) 360 and device certificate chain 370, all data uniquely associated with cryptographic device 230. In particular, to permanently retain its stored data, memory 340 may be implemented as non-volatile memory (e.g., read only memory, any type of programmable read only memory, flash memory, etc.) or volatile memory (e.g., random access memory "RAM", battery backed RAM, etc.). As an alternative embodiment, however, memory 340 may also include security kernel 320 and TAE 330 in the event of memory space constraints.

As further shown, device certificate chain 370 includes one or more "device certificates" which are data used to identify cryptographic device 230. For example, certificate 370 includes PUKD 350 digitally signed with PRKCA. Herein, PRKCA is a private key of a manufacturer of cryptographic device 230. However, it is contemplated that PRKCA may be a private key of another certification authority such as, a bank, governmental entity, trade association, or other original equipment manufacturer.

Figure 4:
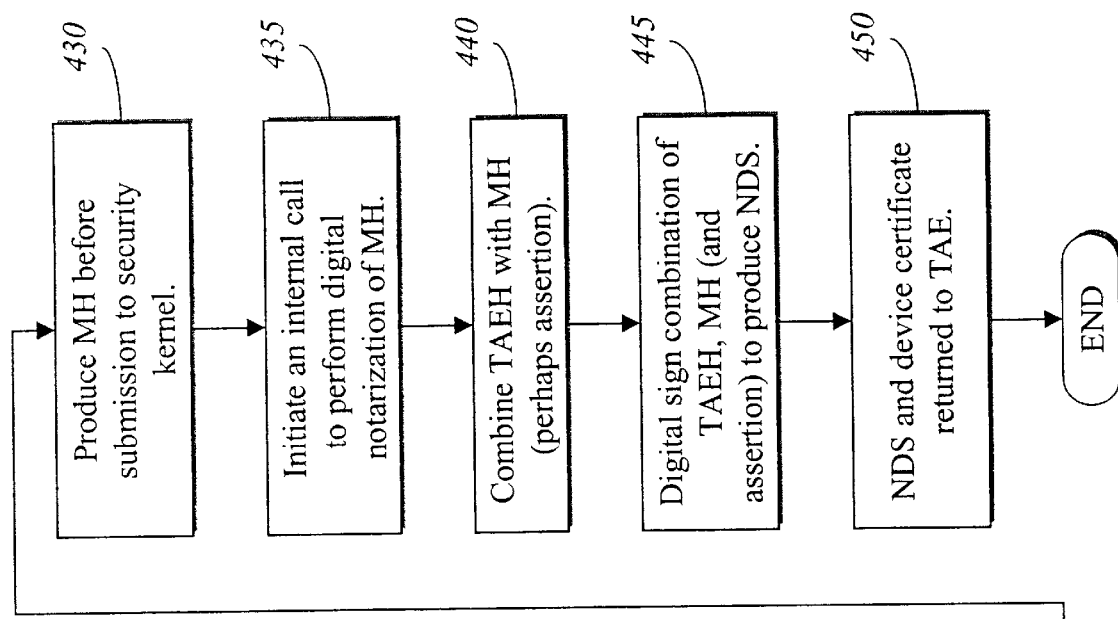
FIG. 4 is an illustrated embodiment of the protocol followed by the TAE and security kernel to configure the system of FIG. 1.
Figure 4:
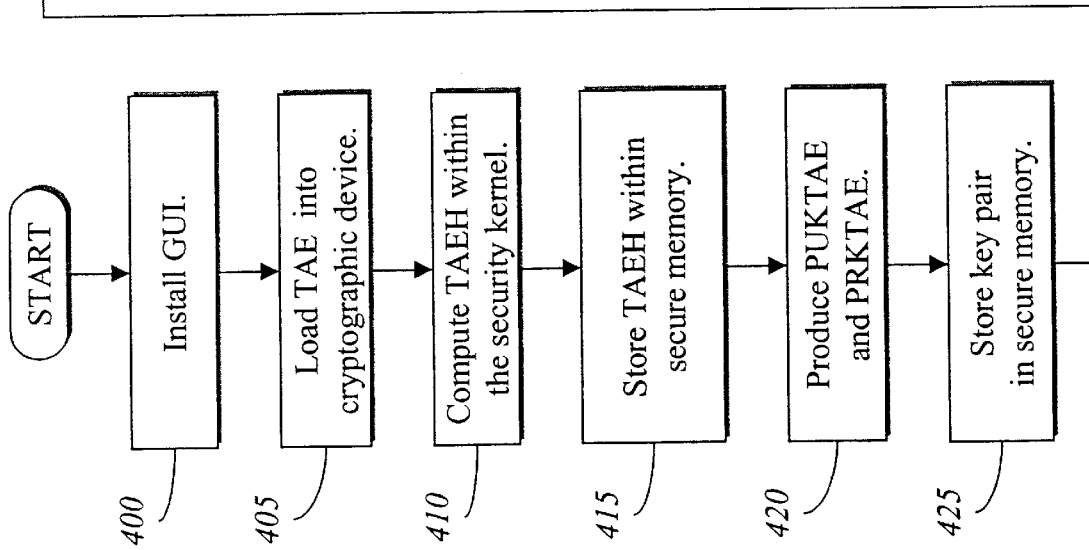

Referring now to FIG. 4, an embodiment of a protocol used to configure the system is described. This protocol is designed to protect the integrity of content received from a trusted agent executable (TAE) employed within the digital platform. During configuration, a graphical user interface (GUI) is installed within the digital platform (block 400) while a selected type or version of TAE is loaded into memory of the cryptographic device of FIG. 2 (block 405). Thereafter, in block 410, the security kernel of the cryptographic device computes a hash value for the TAE (referred to as a trusted agent executable hash "TAEH"). This is accomplished by a single or iterative hash operations on the TAE. TAEH is temporarily stored within secure memory of the cryptographic device (block 415), accessible to the security kernel but not to the TAE.

After producing TAEH, the cryptographic device commences execution of the TAE. As one possible activity, the TAE produces a request for generation of a key pair by the security kernel (block 420). This key pair includes a pair of unique public and private keys (PUKTAE and PRKTAE) to be associated with this specific instantiation of this type or version of the TAE. Upon receipt, the key pair is stored in secure memory (block 425), accessible to the TAE. In one embodiment, PUKTAE is included within a message to (i) identify the TAE, (ii) enable verification of the integrity of data produced by the digital platform, and (iii) enable confidential communications with the TAE. This message (M) may include, for example, a copy of data provided to the head-end equipment and/or a current monotonic count value. Message (M) undergoes a hash operation to produce a message hash (MH) prior to submission to the security kernel (block 430). Of course, as alternative embodiments, the hash operation may be performed by the security kernel instead of at the application level.

Thereafter, the cryptographic device initiates an internal call for the security kernel (block 435) to perform a "digital notarization" of MH, which is then executed by the kernel in blocks 440–450. In block 440, the MH provided by the TAE is combined with the previously stored TAEH and possibly with an "assertion", e.g. by concatenation, modulo addition or any another arithmetic operation. The "assertion" is a statement indicating the purpose for a digital signature. For example, the assertion may include information concerning the type, model or version number of the cryptographic device. By combining the kernel-produced TAEH with at least MH, the digital notarization allows the content provider to detect if MH has been produced by a modified TAE. After TAEH, MH and perhaps the assertion are combined (block 440), the combined result is digitally signed with PRKD to produce a "notary digital signature" (NDS) as shown in block 445. NDS along with a device certificate chain, namely at least one certificate including PUKD encrypted with PRKCA, is returned to the TAE (block 450). Additionally, the TAEH, assertion, and combined result from block 440 may be returned to the TAE in the event that these values are not predeterminable.

Figure 5:
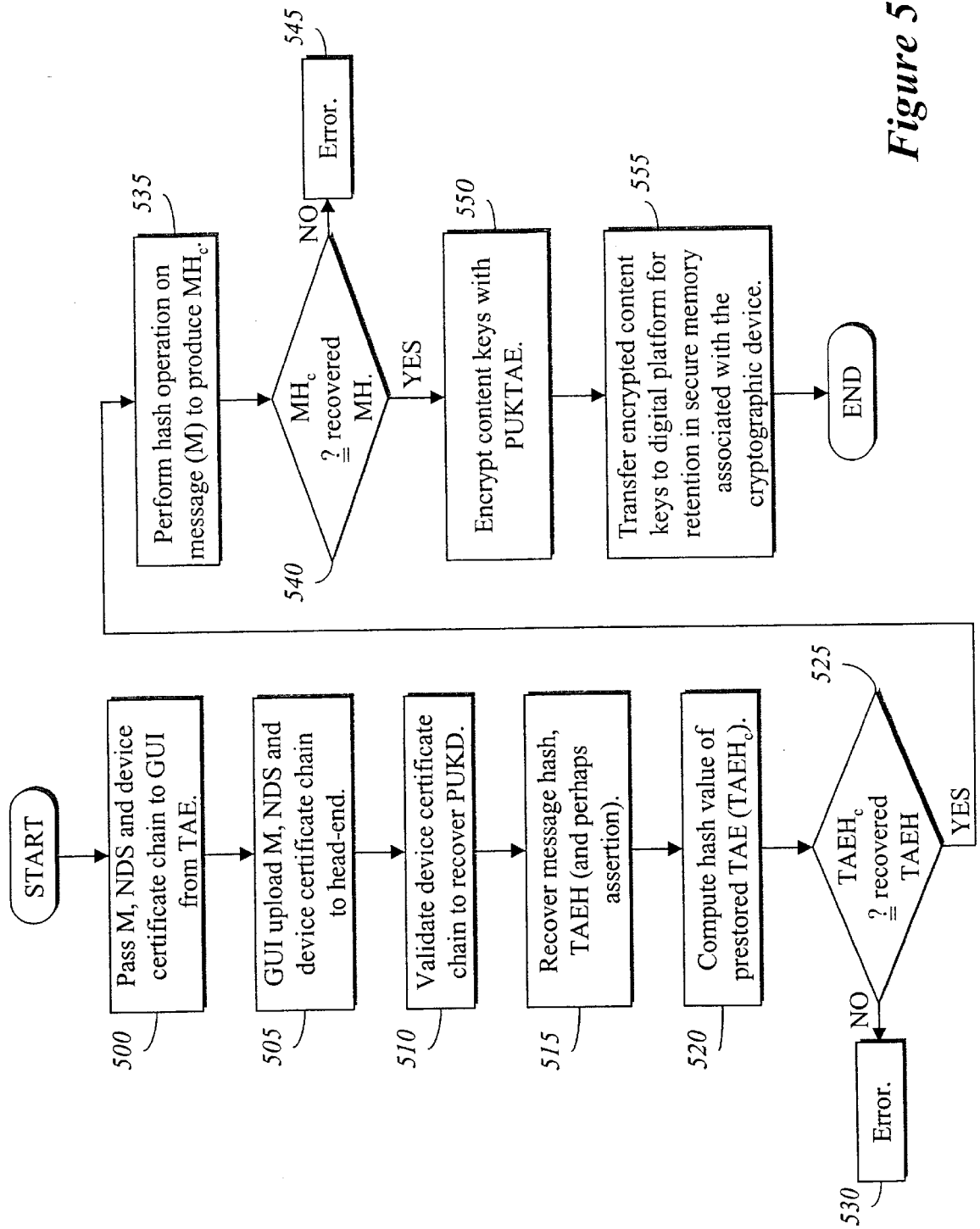
FIG. 5 is an illustrative embodiment of the protocol followed by the GUI and head-end equipment to configure the system of FIG. 1.

As shown in FIG. 5, upon receipt of NDS, the device certificate chain and other optional information, TAE passes the same to the GUI of the digital platform (block 500). The GUI is designed to contact the head-end equipment and to upload this information to the head-end equipment (block 505).

Figure 7:
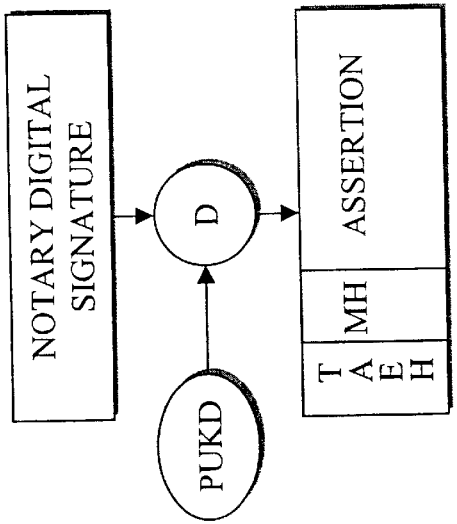
FIG. 7 is an illustrative embodiment of the operations for recovering the combined result, inclusive of TAEH and MH, from the notary digital signature.
Figure 6:
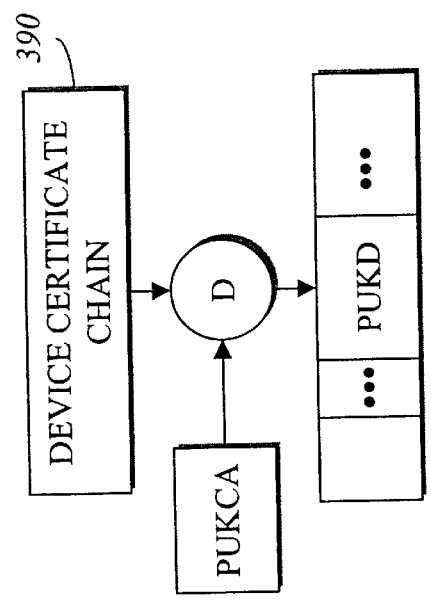
FIG. 6 is an illustrative embodiment of the validation of the device certificate chain.
Figure 8:
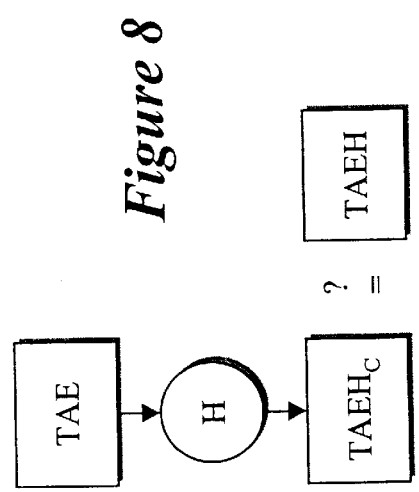
FIG. 8 is an illustrative block diagram of an embodiment of the present invention in which the recovered TAEH and computed TAEH are compared.

At the head-end equipment, the device certificate chain is validated to recover data, inclusive of PUKD as also shown in FIG. 6 where "D" constitutes a digital signature verify function (block 510). Since the notary digital signature has been digitally signed by PRKD, the recovery of PUKD allows the message hash, TAEH and perhaps the assertion to be recovered and validated as shown in FIG. 7 (block 515). Since the content provider created the original TAE, the TAE as known to be correct by the head-end equipment may be configured to undergo a hash operation (using the same one-way hash function as used by the cryptographic device) to produce a computed TAEH (referred to as "$TAEH_c$") as shown in FIG. 8 (block 520). Such $TAEH_c$ would normally to precomputed and stored at the head-end equipment. $TAEH_c$ is compared to the recovered TAEH (block 525). If the comparison is successful, the head-end equipment is assured that no illicit modification of the TAE has occurred. Otherwise, an error condition is reported and the head-end equipment may take appropriate action (e.g., ignore the communication, send an "alert" to the client GUI, etc.) as shown in block 530.

Figure 9:
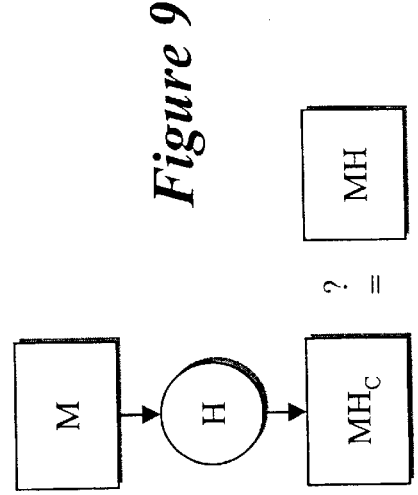
FIG. 9 is an illustrative block diagram of an embodiment of the present invention in which the recovered MH and computed MH are compared.

Similarly, to verify the integrity of the data and check that the message originated from an authorized cryptographic device, the message (M) undergoes a hash operation to compute a resultant message hash ($MH_c$) as set forth in block 535 and shown in FIG. 9. $MH_c$ is compared to the recovered MH (block 540). If the comparison is successful, the head-end equipment is assured that message (M) has not been modified during transmission. Otherwise, the head-end equipment may take appropriate action (block 545).

After the comparisons have been performed and each comparison deemed successful, one or more keys needed to decrypt portions of preloaded, encrypted digital information (referred to as "content keys") may be provided to the GUI and directed to the TAE of the cryptographic device via channel 120 of FIG. 1 (block 550). In particular, the content keys are encrypted with PUKTAE that was provided within the message M and is now available to the content provider. The content keys are provided to and stored internally within secure memory of the cryptographic device to mitigate the chances of uncovering the content keys in a plain text format (block 555). Of course, in lieu of storing the content decryption keys within the cryptographic device, it is contemplated that the protocol may be performed every time after power-up so no permanent content key storage is necessary.

After configuration of the cryptographic device, occasional communications between the digital platform and the content provider may occur for a number of purposes, including credit establishment for example. During these communications, it can be determined whether the digital platform is operating properly or is authorized to receive content keys to decrypt portions of digital content stored in internal memory of the digital platform by cryptographic device providing M, NDS and the device certificate.

Figure 10:
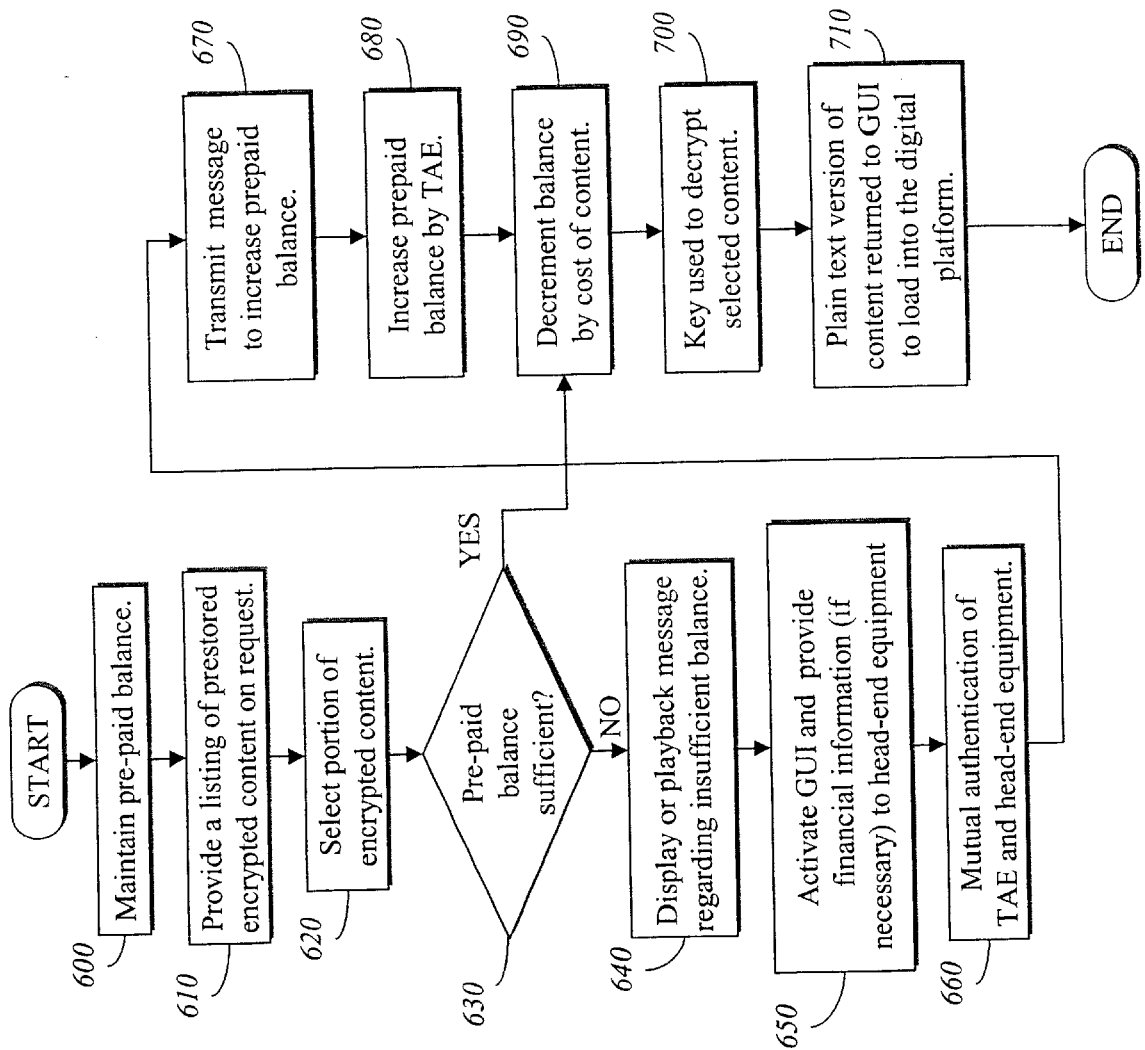
FIG. 10 is an illustrative block diagram of an embodiment of a billing procedure conducted by the digital platform after system configuration.

Referring now to FIG. 10, an illustrative embodiment of a billing procedure conducted by the cryptographic device after installation of TAE is shown. First, in block 600, a prepaid balance is maintained in secure memory associated with the cryptographic device. This prevents the prepaid balance from being modified. Through GUI software, the consumer is provided a listing of prestored encrypted content such as movies, video games and the like (block 610).

Upon the consumer selecting a particular portion of the encrypted content, the GUI passes a message to the TAE indicating that the user has authorized the purchase or limited usage of that particular portion of the encrypted content (block 620). Also, the portion of encrypted content may be routed to the TAE. In response, the TAE determines if the prepaid balance covers the cost of the selected content (block 630). Note that block 650 may be initiated by the user to increase the prepaid balance without the explicit attempt to purchase content.

In the event the prepaid balance is less than the cost of the selected content, a function call may occur to produce a message on a display indicating to the user that the outstanding balance is insufficient to purchase the content (block 640). After perceiving the message, the user activates the GUI to contact the head-end equipment and provides, if not previously provided, credit card information, automated teller machine (ATM), checking account routing number or any other financial information to the head-end equipment (block 650) in order to increase the outstanding balance by a selected amount. The head-end equipment and the TAE mutually authenticate each other to ensure that their communication path is secure as described in FIGS. 4 and 5 (block 660). This protects the system against anti-replay conditions. Once the communication path is secure and authorization for a financial debit is received, the head-end equipment transmits a message to the TAE to increase the prepaid balance by the selected amount (block 670). The TAE adds the selected amount to the outstanding balance in secure memory (block 680).

If the prepaid balance then or now exceeds the cost of the selected content, the TAE decrements the outstanding balance by the appropriate costs of the selected content (block 690). Thereafter, a key previously loaded into secure memory of the processing logic is used to decrement the encrypted content (block 700). The plain text version of the content is returned to the GUI for installation on the digital platform for later viewing, listening or other sensory perception by the user (block 710).

The present invention described herein may be designed in accordance with many different methods and using many other embodiments that may come to mind to a person skilled in the art, without that person departing from the spirit and scope of the present invention. The invention should, therefore, be measured in terms of the claims which follow.

What is claimed is:

1. A cryptographic device comprising:
   a processing logic; and
   a memory associated with the processing logic, the memory loaded with a first segment of code and a second segment of code, the first segment of code to at least produce a notary digital signature when executed by the processing logic, the notary digital signature including a combined result of (i) a hash value of the second segment of code and (ii) an assertion indicating a purpose of the notary digital signature, the combined result digitally signed with a private key of the cryptographic device.

2. The cryptographic device of claim 1, wherein the first segment of code is a kernel running at ring 0.

3. The cryptographic device of claim 1, wherein the combined result further includes a hash value of a message.

4. The cryptographic device of claim 3, wherein the hash value of the message, the hash value of the second segment of code and the assertion are concatenated to produce the combined result.

5. The cryptographic device of claim 3, wherein the hash value of the message, the hash value of the second segment of code and the assertion undergo modular addition to produce the combined result.

6. The cryptographic device of claim 1, wherein the second segment of code performs operations on behalf of a third party having no physical control of hardware employing the cryptographic device when executed by the processing logic.

7. The cryptographic device of claim 3, wherein the second segment of code is a trusted agent executable to perform content metering when executed by the processing logic.

8. The cryptographic device of claim 1, wherein the assertion of the notary digital signature includes data to identify the cryptographic device.

9. The cryptographic device of claim 8, wherein the data to identify the cryptographic device includes at least one of a model number and a version number.

10. The cryptographic device of claim 3, wherein the message includes a public key of the trusted agent executable.

11. The cryptographic device of claim 10, wherein the message further includes at least one of (i) data originally provided by head-end equipment and (ii) a monotonic count value.

12. A digital platform comprising:
    a substrate;
    a memory coupled to the substrate, the memory including a graphical user interface and content in an encrypted format; an
    a cryptographic device coupled to the substrate and in secure communications with the memory, the cryptographic device being loaded with (1) a trusted agent executable to perform content metering, and (2) a security kernel being code, in communications with the trusted agent executable, that produces a notary digital signature including an assertion indicating a purpose of the notary digital signature.

13. The digital platform of claim 12, wherein the notary digital signature produced by the security kernel includes a concentration of a hash value of a message, a hash value of the trusted agent executable and the assertion.

14. The digital platform of claim 13, wherein the security kernel further passes the message, the notary digital signature and a digital certificate chain to the graphical user interface for output from the digital platform.

15. A method for ensuring the integrity of data exchanged between a platform and head-end equipment, comprising:
    receiving a selected trustee agent executable by the platform; and
    transmitting a notary digit signature, the notary digital signature including a combined result of a hash value of a message, a hash value of the selected trusted agent executable and an assertion to indicate a purpose of the notary digital signature, the combined result digitally signed by a private key associated with the cryptographic device.

16. The method of claim 15 further comprising:
    transmitting the message an a device certificate chain, the device certificate chain including at least one device certificate having a key associated with the platform for use in recovering the hash value of the message, the hash value of the selected trusted agent executable and the assertion from the notary digital signature.

17. The method of claim 16, wherein the message includes a public key of the selected trusted agent executable.

18. The method of claim 17, wherein the message further includes at least one of (i) data originally provided by the head-end equipment and (ii) a monotonic count value.

19. The method of claim 15 further comprising:

recovering the hash value of the message from the notary digital signature;

recovering the hash value of the selected trusted agent executable from the notary digital signature; and recovering the assertion from the notary digital signature.

* * * * *